United States Patent [19]

Kapps et al.

[11] Patent Number: 4,792,262
[45] Date of Patent: Dec. 20, 1988

[54] PROCESS FOR STRENGTHENING GEOLOGICAL FORMATIONS

[75] Inventors: Manfred Kapps, Gladbach; Max Mann, Odenthal; Peter Vehlewald, Leichlingen; Frank Meyer; Hans-Ernst Mehesch, both of Essen; Wolfgang Cornely, Gladbeck; Birgit Riecks, Essen, all of Fed. Rep. of Germany

[73] Assignee: Bayer Aktiengesellschaft, Bayerwerk, Fed. Rep. of Germany

[21] Appl. No.: 898,452

[22] Filed: Aug. 20, 1986

[30] Foreign Application Priority Data

Sep. 11, 1985 [DE] Fed. Rep. of Germany ....... 3532387

[51] Int. Cl.$^4$ .......... E02D 3/12; C08G 18/76
[52] U.S. Cl. ..................... 405/264; 166/295; 299/11; 523/130
[58] Field of Search ............... 405/258, 263, 264, 265, 405/270; 166/293, 295; 299/11; 523/130, 131, 132

[56] References Cited

U.S. PATENT DOCUMENTS

| Re. 31,946 | 7/1985 | Meyer et al. | 166/295 |
|---|---|---|---|
| 3,798,186 | 3/1974 | Nakade et al. | 260/2.5 A |
| 4,097,587 | 6/1978 | Soma et al. | 260/45.8 |
| 4,113,014 | 9/1978 | Kubens et al. | 405/264 |
| 4,114,382 | 9/1978 | Kubens et al. | 405/264 |
| 4,277,203 | 7/1981 | Reed, Jr. et al. | 405/264 |
| 4,295,762 | 10/1981 | Slovinsky | 405/264 |
| 4,307,980 | 12/1981 | Meyer et al. | 166/295 |
| 4,391,926 | 7/1983 | Creyf | 523/132 |
| 4,452,551 | 6/1984 | Arndt et al. | 405/264 |
| 4,454,252 | 6/1984 | Meyer | 405/264 |
| 4,475,847 | 10/1984 | Cornely et al. | 405/264 |
| 4,497,595 | 2/1985 | Meyer et al. | 405/260 |
| 4,614,754 | 9/1986 | Christmar | 405/288 |

FOREIGN PATENT DOCUMENTS

| 1758185 | 4/1968 | Fed. Rep. of Germany . |
|---|---|---|
| 1784458 | 10/1971 | Fed. Rep. of Germany . |
| 885762 | 3/1960 | United Kingdom . |

OTHER PUBLICATIONS

Gluckauf Journal, 1968, pp. 666–670.
Gluckauf Journal, 1977, pp. 707–711.
Bergbau Journal, 1977, pp. 124–129.

Primary Examiner—David H. Corbin
Attorney, Agent, or Firm—Gene Harsh; Joseph C. Gil; Thomas W. Roy

[57] ABSTRACT

The present invention is directed to a process for strengthening geological formations in underground mining or other operations introducing into the formation which is to be strengthened mixtures of a polyisocyanate component (a) and a polyol component (b) which react together to form polyurethanes, characterized in that the polyol component (b) is based on mixtures of (i) organic polyhydroxyl compounds having hydroxyl numbers of about 100 to 600 and (ii) dihydric alcohols having a molecular weight of 62 to about 150, component (ii) being present in an amount of about 0.01 to 20% by weight, based on the total quantity of component (b).

6 Claims, No Drawings

PROCESS FOR STRENGTHENING GEOLOGICAL FORMATIONS

BACKGROUND OF THE INVENTION

1. Field of the Invention

This invention relates to a new process for strengthening geological formations in underground mining or other underground operations, in particular in coal mining by forming polyurethanes from mixtures of organic polyisocyanates and polyhydroxyl compounds containing special dihydric alcohols as viscosity reducing additives in order to improve the mixing process, accelerate hardening and regulate the foaming process.

2. Description of the Prior Art

The strengthening of geological formations below ground, particularly in coal mining, by means of polyurethanes which foam and harden within the formation is already known (see e.g. the Journals, Glükauf (1968), pages 666 to 670, Glükauf (1977) pages 707 to 711 and Bergbau (1977), pages 124 to 129, DE-PS 1,129,894, DE-PS 1,758,185, DE-PS 1,784,458, DE-PS 2,436,029, DE-PS 2,623,646 and DE-PS 3,139,395). Such mixtures which react to form polyurethanes are also used to seal the structures against water and/or gas. This known process is generally carried out as follows.

The two reaction components, the polyisocyanate and polyhydric alcohol (polyhydroxyl component), are conveyed separately to a position in front of a borehole where they are continuously combined in a static mixer and pressed through the borehole into the rock formation where they foam up and harden.

The polyhydroxyl component used in this state of the art process is preferably based on mixtures of polyether polyols and castor oil. Fat derivatives containing hydroxyl groups, in particular castor oil, increase the binding property and strength of adherence as well as the flexibility of the polyurethane mixtures. At the same time, these polyols act as defoaming agents, thereby suppressing excessive foaming of the polyurethane resin which would impair the mechanical properties. The castor oil is generally used in quantities of 1 to 50% by weight, preferably 5 to 20%, based on the polyol mixture. It therefore constitutes a significant cost factor, especially since the price of this natural product is subject to wide fluctuations and is on average considerably higher in price than other polyols. Moreover, being a natural product, castor oil is also subject to wide variations in quality.

Another very serious technical disadvantage of these polyols mixtures containing castor oil is that they have little compatibility with polyisocyanates. Although a homogeneous emulsion may be obtained by prolonged and vigorous mixing of the two components, such an emulsion at least partially separates into its components within a short time such that the components do not always react quantatively in the gaps of the formations. The known strengthening process therefore becomes unreliable. Another disadvantage is the long curing time (2 to 2.5 hours) of the polyurethane resin obtained from the polyol mixtures containing castor oil and the above-mentioned polyisocyanates. Since the quality of the reinforcement depends upon the strength of the hardened polyurethane resin, it will be obvious that a long hardening time results in considerable delays before work may be resumed.

Practice has shown that the high viscosity of polyol mixtures containing castor oil may also have an adverse effect on the degree of strengthening obtained.

Therefore, there was a need for another solution which, while retaining the advantageous effect mentioned above, would not have the disadvantages described.

It has now surprisingly been found that by using certain dihydric alcohols not only can the disadvantages described above be obviated, but the properties of the polyurethane can be improved.

SUMMARY OF THE INVENTION

The present invention is directed to a process for strengthening geological formations in underground mining or other operations by introducing into the formation which is to be strengthened mixtures of a polyisocyanate component (a) and a polyol component (b) which react together to form polyurethanes, characterized in that the polyol component (b) is based on mixtures of (i) organic polyhydroxyl compounds having hydroxyl numbers of about 100 to 600 and (ii) dihydric alcohols having a molecular weight of 62 to about 150, component (ii) being present in an amount of about 0.01 to 20% by weight, based on the total quantity of component (b).

DETAILED DESCRIPTION OF THE INVENTION

Polyisocyanate component (a) is preferably based on polyphenylene-polymethylene-polyisocyanates obtained by the aniline/formaldehyde condensation followed by phosgenation ("polymeric MDI") or derivatives of these polyisocyanates which contain carbodiimide, biuret, urethane and/or allophanate groups and are liquid at room temperature. The polyisocyanate mixtures ("polymeric MDI") which are obtained by the phosgenation of aniline/formaldehyde condensates and are liquid at room temperature as well as their liquid reaction products containing isocyanate groups and obtained by the reaction of the said mixtures with subequivalent quantities (NCO/OH molar ratio=about 1:0.005 to 1:0.3) of polyhydric alcohols having a molecular weight of 62 to about 3000, in particular polyols having a molecular weight range of 106 to about 3000 and containing ether groups, are especially preferred. Mixtures of 2,4'- and 4,4'-diisocyanatodiphenylmethane which are liquid at room temperature are also suitable for use as polyisocyanate component (a). Other organic polyisocyanates could in principle also be used according to the invention, e.g. those disclosed in DE-OS 2,832,253 at pages 10 and 11 or in U.S. Pat. No. 4,263,408, herein incorporated by reference in its entirety, at columns 3 and 4. Polyisocyanate mixtures of the diphenylmethane series having a viscosity at 25° C. of about 50 to 500 mPa.s and an isocyanate content of about 30 to 32% by weight are particularly preferred.

Polyol component (b) is based on mixtures of (i) organic polyhydroxyl compounds having an OH number of about 100 to 600, preferably about 250 to 400, with (ii) dihydric alcohols. The polyhydroxyl compounds (i) are preferably polyether polyols of the kind known from polyurethane chemistry or mixtures of such polyether polyols. When mixtures of different polyhydroxyl compounds are used, the above-mentioned figures given for the hydroxyl number refer to these mixtures. This means that individual components of the mixtures may have hydroxyl numbers which are outside the given range. Examples of suitable polyether polyols are the propoxylation products of starter molecules having functionalities of 2 to 8 such as water, 1,2-dihydroxypropane, trimethylolpropane, pentaerythritol, glycerol, sorbitol, ethylene diamine and optionally cane sugar. Component (i) generally has an average hydroxyl functionality of about 2.0 to 5.0, preferably about 2.0 to 3.0. Mixtures may be obtained, for example, by subjecting mixtures of starter molecules to a propoxylation reaction or, alternatively, different polyhydroxy polyethers may be separately prepared and then mixed together to form component (i) according to the invention.

Component (ii) is based on dihydric alcohols having a molecular weight of 62 to about 150 or mixtures of such alcohols. Examples of suitable dihydric alcohols include in particular mono-, di- and tri-ethylene glycol, mono- and dipropylene glycol and any mixtures of such glycols. Other diols within the above-mentioned molecular weight range are in principle also suitable and include 1,3-dihydroxypropane, 1,4-dihydroxybutane or 1,6-dihydroxyhexane. Component (b) contains the dihydric alcohols (ii) in a quantity of about 0.01 to 20% by weight, preferably about 0.1 to 5% by weight, based on the total weight of component (b).

The following are examples of auxiliary agents and additives which may optionally be used:

(1) water, which may be used in a quantity of up to about 5% by weight, preferably up to about 4% by weight, based on the weight of component (b);

(2) catalysts for the isocyanate addition reaction, in particular organic tin compounds such as tin(II) octoate or dibutyl tin dilaurate or tert.-amines such as N,N-dimethylbenzylamine or triethylenediamine, in quantities of up to about 2% by weight, preferably about 0.3 to 1% by weight, based on the weight of component (b);

(3) organic blowing agents such as trichloromonofluoromethane, dichlorodifluoromethane or methylene chloride; and (4) foam regulators, e.g. the polyether polysiloxanes known for this purpose.

Other auxiliary agents and additives optionally used include flame retardants (e.g. phosphoric acid derivatives) and organic and inorganic fillers (e.g. urea, calcium carbonate, mica or talcum).

The reaction mixtures to be used in the process according to the invention contain the individual components in quantities corresponding to an isocyanate index of about 90 to 150, preferably about 120 to 140. By "isocyanate index" is meant the quotient of the number of isocyanate groups in the reaction mixture divided by the number of isocyanate reactive groups present in the reaction mixture and multiplied by 100, water being counted as a difunctional compound.

Any auxiliary agents and additives to be used in the process according to the invention are generally first combined with polyol component (b) before the process is carried out using the two components. This means that for preparing the reaction mixtures, polyisocyanate component (a) is vigorously mixed with polyol component (b) or with the mixture of polyol component (b) and the auxiliary agents and additives. The conventional state of the art mixing apparatus may be used for this purpose.

The process according to the invention is carried out using methods known in the art by drilling a plurality of holes about 2 to 6 m in depth and about 20 to 60 mm in diameter into the formations to be strengthened and introducing the mixtures according to the invention into these holes. The drill holes are generally sealed off by a drill hole closure having a passage through which the reaction mixture can be injected by way of a pipe, a non-return valve being provided in the passage to prevent the reaction mixture from leaking out of the drill hole after injection has been completed. The injection may be carried out under pressures of up to 100 bar or more, but excessively high pressures may cause collapse of the coal or rock.

The process according to the invention may also be carried out according to U.S. Pat. No. 3,698,196 wherein polyisocyanate component (a) on the one hand and polyol component (b) together with any auxiliary agent and additive on the other hand are introduced into the separate compartments of a two-chamber cartridge in proportions conforming to the isocyanate index mentioned above, and the cartridge is then introduced into the previously prepared drill hole where it is mechanically destroyed so that the two components are mixed together. The drill hole is then sealed after destruction of the cartridge. This procedure, however, is found to be less advantageous than the first mentioned procedure.

When the drill holes have been sealed and the liquid resin has been introduced the mixture hardens and preferably foams as it penetrates the formations (which are to be strengthened) under its own foaming pressure and at the same time completely fills the drill hole. The resulting polyurethane resins, in particular polyurethane foams, permanently strengthen the geological formations by virtue of their excellent adherence to coal or rock and their excellent mechanical properties.

The invention is further illustrated, but is not intended to be limited by the following examples in which all parts and percentages are by weight unless otherwise specified.

EXAMPLES

Polyol 1: A polyether polyol based on sucrose and propylene glycol in a hydroxyl equivalent ratio of 45:55 and propylene oxide having an OH number of 380 and a viscosity of 505 mPa.s at 25° C. (state of the art).

Polyol 2: A polyether polyol based on glycerine and propylene oxide having a OH number of 380 and a viscosity of 450 mPa.s at 25° C.

Polyol 3: A polypropylene glycol having an OH number of 265 and a viscosity of 71 mPa.s at 25° C.

Castor oil 1st pressing, iodine number 87.2, OH number 158, water content 0.14% and viscosity 678 mPa.s at 25° C.

Ethylene glycol (EG): OH number 1810 and viscosity 18 mPa.s at 25° C.

Diethylene glycol (DEG): OH number 1002 and viscosity 30 mPa.s at 25° C.

Triethylene glycol (TEG): OH number 748 and viscosity 40 mPa.s at 25° C.

Propylene glycol (PG): OH number 1537 and viscosity 47 mPa.s at 25° C.

Ethylene glycol/triethylene glycol (EG/TEG): Mixture of ethylene glycol/triethylene glycol (50:50% by weight), OH number 1279 and viscosity 27 mPa.s at 25° C.

MDI: An isocyanate obtained by the phosgenation of a formaldehyde/aniline condensate and having a diisocyanatodiphenylmethane content of about 60%, an isocyanate content of 31% and a viscosity of 140 mPa.s at 25° C.

|  | Comparison mixture (Parts by wt) | | | Mixture according to the invention (Parts by wt) | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Polyol 1 | 64 | — | 64 | 48 | 48 | 48 | 35 | 35 | 47.8 | — | — | — |
| Polyol 2 | — | 64 | — | — | — | — | — | — | — | 48 | 48 | 35 |
| Polyol 3 | 26 | 26 | 25.8 | 48 | 48 | 48 | 61 | 61 | 48 | 48 | 48 | 61 |
| Castor oil | 9 | 9 | 9 | — | — | — | — | — | — | — | — | — |
| EG | — | — | — | 3 | — | — | — | — | — | 3 | — | — |
| DEG | — | — | — | — | — | — | 3 | — | — | — | 3 | — |
| TEG | — | — | — | — | 3 | — | — | — | — | — | — | — |
| PG | — | — | — | — | — | — | — | 3 | — | — | — | — |
| EG/TEG (50:50) | — | — | — | — | — | 3 | — | — | 3 | — | — | 3 |
| Catalyst (dibutyl tin dilaurate) | — | — | 0.2 | — | — | — | — | — | 0.2 | — | — | — |
| $H_2O$ | 1 | 1 | 1 | 1 | 1 | 1 | 1 | 1 | 1 | 1 | 1 | 1 |
| MDI | 120 | 120 | 120 | 120 | 120 | 120 | 120 | 120 | 120 | 120 | 120 | 120 |
| Stirring time to compatibility (sec.) | 195 | 185 | 40 | 155 | 132 | 135 | 99 | 110 | 15 | 115 | 95 | 82 |
| Viscosity of the polyol mixture (mPa · s 25° C.) | 307 | 305 | 307 | 162 | 166 | 164 | 131 | 129 | 163 | 144 | 145 | 119 |
| Curing time (h) | 2.5 | 2.5 | 0.5 | 1.75 | 1.5 | 1.5 | 1.25 | 1.25 | 0.25 | 1.25 | 1.25 | 1.25 |

EXAMPLE 1

The mixtures indicated in the Table were prepared. To determine the compatibility, the components were vigorously stirred in cardboard cups by means of a wooden spatula until a homogeneous phase appeared (clear point). In the case of comparison mixtures 1 to 3, all that could be obtained within the given mixing times was a homogeneous emulsion partly produced by the reaction of the components. The Table shows that the mixtures according to the invention (4 to 12) have distinct advantages over the mixtures of the state of the art (1 to 3) in the miscibility of the polyol mixtures with the polyisocyanate, the viscosity of the polyol mixtures and the curing time of the polyurethane resin.

EXAMPLE 2

Experiments were carried out in a long wall sloping by 5 to 30 centesimal degrees of a seam having a thickness of 3 to 4 m. The upper third of the long wall, which sloped down by about 30 centesimal degrees, was under severe tectonic stress due to canting of the work face and minor faults. In this section of the long wall, which was about 80 m in length, the coal tended to slope down and the roof in parts broke down at a height of 4 to 5 m. This resulted in prolonged periods of standstill with preliminary removal of coal by hand. Du to the use of a modern long wall technique, it was necessary to secure the rapidly advancing coal face and hence the output capacity by strengthening the face with polyurethane. The condition to be fulfilled was that the strengthened zone of the coal face should be ready for cutting only 2 hours after the beginning of the strengthening operation. Comparison mixtures 1 and 2 were first employed. Due to the long curing time of the polyurethane resin produced, this aim could not be achieved. Mixture 6 was then used for strengthening and coal cutting was begun after 1.5 hours. No further dipping of the coal face and consequent roof collapses then occurred.

EXAMPLE 3

An old brick-lined shaft was required to be reconstructed. The wall of the shaft had to be sealed off as water leaked out of the porous brickwork. The water was at a temperature of about 15° C.

To strengthen and seal the shaft, comparison mixture 1 was injected to a depth of about 2 m through holes drilled at intervals of 30 cm. Even while injection was taking place, water seeped out of the finely cracked wall followed by a milky emulsion of water and polyol mixture and finally MDI which contained only small quantities of polyol. The MDI reacted with the water to form a brittle polyurea and sealing and strengthening could not be achieved. Polyol mixture 8 according to the invention was then injected. No water leaked out of the cracks after an initial escape of polyurethane foam. This was an indication that due to their excellent compatibility, the two components of the mixture were not separated by the water in the brickwork. The wall of the shaft thus could not only be strengthened but also sealed.

EXAMPLE 4

In order to correct distortions of the workings near the coal face and prevent collapses in the region of transition from long wall to working space in a retreat working system, the seam was required to be strengthened as far in front of the long wall as possible. It was found that 50 m in front of the long wall, the rock had not been sufficiently loosened up by the pressure of the rapidly advancing coal face to be able to absorb the known polyurethane strengthening system in the required quantity. Using drill holes at intervals of 5 m beginning 50 m before the long wall, comparison mixture 1 was injected into the drill holes. When an injection pressure of 120 bar was employed, the drill holes only took up about 6 kg of polyurethane system per m of working space. As the long wall worked its way through the treated zone, it was found that the roof was not sufficiently strengthened, and roof collapses continued to occur in the region of transition between long wall and working space.

Drill holes were than again made as indicated above, beginning 50 m in front of the long wall, and injected with mixture 12 according to the invention in this region at the same injection pressure. The quantity of resin which could be introduced amounted to 25 to 30 kg per meter of working space. Roof collapses as the long wall passed through this zone were thereby prevented.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for strengthening geological formations in underground mining or other operations which comprises introducing into the formation to be strengthened, a polyurethane-forming reaction mixture comprising
   (a) a polyisocyanate component and
   (b) a polyol component comprising a mixture of
       (i) an organic polyhydroxyl compound having an OH number of about 100 to 600 and
       (ii) about 0.1 to 5% by weight, based on the total quantity of component (b), of a dihydric alcohol having a molecular weight of 62 to about 150.

2. The process of claim 1 wherein said dihydric alcohol comprises a member selected from the group consisting of propylene glycol, dipropylene glycol, ethylene glycol, diethylene glycol, triethylene glycol and mixtures thereof.

3. The process of claim 1 wherein said polyisocyanate component is based on crude MDI and is liquid at room temperature.

4. The process of claim 3 wherein said dihydric alcohol comprises a member selected from the group consisting of propylene glycol, dipropylene glycol, ethylene glycol, diethylene glycol, triethylene glycol and mixtures thereof.

5. A process for strengthening geological formations in underground mining or other operations which comprises introducing into the formation to be strengthened, a polyurethane-forming reaction mixture comprising
   (a) a polyisocyanate component and
   (b) a polyol component comprising a mixture of
       (i) an organic polyhydroxyl compound having an OH number of about 100 to 600 and
       (ii) about 0.01 to 20% by weight, based on the total quantity of component (b) of a dihydric alcohol comprising a member selected from the group consisting of propylene glycol, ethylene glycol, diethylene glycol, triethylene glycol and mixtures thereof.

6. The process of claim 5 wherein said polyisocyanate component is based on crude MDI and is liquid at room temperature.

* * * * *

UNITED STATES PATENT AND TRADEMARK OFFICE
CERTIFICATE OF CORRECTION

PATENT NO. : 4,792,262
DATED : December 20, 1988
INVENTOR(S) : Manfred Kapps et al It is certified that error appears in the above-identified patent and that said Letters Patent is hereby corrected as shown below:

Patent assignees:

--BAYER AKTIENGESELLSCHAFT, Leverkusen, Federal Republic of Germany and BERGWERKSVERBAND GmbH, Essen, Federal Republic of Germany--.

Column 5, line 50, correct "Du" to read --Due--.

Signed and Sealed this

Tenth Day of October, 1989

Attest:

DONALD J. QUIGG

Attesting Officer

Commissioner of Patents and Trademarks